(12) United States Patent
Scherzer et al.

(10) Patent No.: US 7,031,754 B2
(45) Date of Patent: Apr. 18, 2006

(54) SHAPABLE ANTENNA BEAMS FOR CELLULAR NETWORKS

(75) Inventors: Shimon B. Scherzer, Sunnyvale, CA (US); Scot D. Gordon, Bethall, WA (US); Gary A. Martek, Edgewood, WA (US); Deepa Ramakrishna, Santa Clara, CA (US)

(73) Assignee: Kathrein-Werke KG, Rosenheim (DE)

( * ) Notice: Subject to any disclaimer, the term of this patent is extended or adjusted under 35 U.S.C. 154(b) by 699 days.

(21) Appl. No.: 09/878,599

(22) Filed: Jun. 11, 2001

(65) Prior Publication Data
US 2002/0193104 A1   Dec. 19, 2002

(51) Int. Cl.
*H04B 1/38* (2006.01)

(52) U.S. Cl. .............. 455/562.1; 455/422.1; 455/446; 342/371

(58) Field of Classification Search .......... 455/562.1, 455/422.1, 446, 63.4; 342/367, 368, 371, 342/372, 373
See application file for complete search history.

(56) References Cited

U.S. PATENT DOCUMENTS

| | | | |
|---|---|---|---|
| 5,565,873 A | 10/1996 | Dean | |
| 5,889,494 A | 3/1999 | Reudink et al. | |
| 5,905,462 A * | 5/1999 | Hampel et al. | 342/372 |
| 5,973,641 A | 10/1999 | Smith et al. | |
| 5,987,037 A | 11/1999 | Gans | |
| 6,198,434 B1 | 3/2001 | Martek et al. | |
| 6,246,674 B1 | 6/2001 | Feuerstein et al. | |
| 6,463,301 B1 * | 10/2002 | Bevan et al. | 455/562.1 |

OTHER PUBLICATIONS

U.S. Appl. No. 09/384,306, filed Aug. 26, 1999, Feuerstein et al.

(Continued)

*Primary Examiner*—Lee Nguyen
(74) *Attorney, Agent, or Firm*—Fulbright & Jaworski LLP

(57) ABSTRACT

Systems and methods are disclosed which provide aggressively sculpted or shaped antenna beams, such as sector antenna beams, for use in communication networks. Preferred embodiments use passive antenna feed networks, preferably configured as personality modules, which are adapted for corresponding topological and morphological features. Preferred embodiment feed networks may be coupled to linear or curvilinear antenna arrays to provide antenna beams having a desired contour. Using the disclosed systems and methods path loss variance is minimized for improved system capacity and/or signal quality. Moreover, the disclosed systems and methods provide for reduced average transmission power levels further allowing increased capacity and/or signal quality.

56 Claims, 10 Drawing Sheets

OTHER PUBLICATIONS

U.S. Appl. No. 08/924,285, filed Sep. 5, 1997, Feuerstein et al.
U.S. Appl. No. 08/786,725, filed Jan. 27, 1997, Reudink et al.
U.S. Appl. No. 09/789,151, filed Mar. 2, 2001, Martek.
U.S. Appl. No. 09/618,088, filed Jul. 17, 2000, Wong et al.
U.S. Appl. No. 09/798,151, filed Mar. 2, 2001, Martek.
U.S. Appl. No. 09/618,088, filed Jul. 17, 2000, Wong et al.
U.S. Appl. No. 09/384,306, filed Aug. 26, 1999, Feuerstein et al.
International Search Report dated Aug. 28, 2002 in PCT/US02/18318.

* cited by examiner

SHAPABLE ANTENNA BEAMS FOR CELLULAR NETWORKS

RELATED APPLICATIONS

The present application is related to the following copending and commonly assigned U.S. patent applications Ser. No. 09/384,306 entitled "Antenna Deployment Sector Cell Shaping System and Method," filed Aug. 26, 1999, which is a continuation-in-part of Ser. No. 08/924,285 entitled "Antenna Deployment Sector Cell Shaping System and Method," filed Sep. 5, 1997, which itself is a continuation-in-part of Ser. No. 08/786,725 entitled "Antenna Deployment Sector Cell Shaping System and Method," filed Jan. 27, 1997; serial number [47586-P032C1-10101919] entitled "Dual Mode Switched Beam Antenna," filed Mar. 2, 2001, which is a continuation of Ser. No. 09/213,640, now U.S. Pat. No. 6,198,434, entitled "Dual Mode Switched Beam Antenna," filed Dec. 17, 1998; and Ser. No. 09/618,088 entitled "Base Station Clustered Adaptive Antenna Array," filed Jul. 17, 2000; the disclosures of all of which are hereby incorporated herein by reference.

TECHNICAL FIELD

The invention relates generally to wireless communications and, more particularly, to providing aggressive beam sculpting or shaping, such as for sector beams of a cellular base station, to thereby provide cell boundary equalization.

BACKGROUND

As wireless communications become more widely used, the number of individual users and communications multiply and, thus, communication system capacity and communication quality become substantial issues. For example, an increase in cellular communication (e.g., cellular telephony, personal communication services (PCS), and the like) utilization results in increased interference experienced with respect to a user's signal of interest due to the signal energy of the different users on the cellular system. Such interference is inevitable because of the large number of users and the finite number of cellular communications cells (cells) and frequency bands, time slots, and/or codes (channels) available.

In code division multiple access (CDMA) networks, for example, a number of communication signals are allowed to operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit. However, despreading of the desired communication unit's signal results in the receiver not only receiving the energy of this desired signal, but also a portion of the energies of other communication units operating over the same frequency band. Accordingly, as the number of users utilizing a CDMA network increases, interference levels experienced by such users increase.

Accordingly, the quality of service (QOS) of communications and the capacity of the communication network are typically substantially impacted by interference or noise energy. For example, CDMA systems are interference limited in that the number of communication units using the same frequency band, while maintaining an acceptable signal quality, is determined by the total energy level within the frequency band at the receiver. Accordingly, outage areas (locations where service is not supported) of cellular networks are often defined in terms of a noise or interference related threshold, such as establishing that the pilot $E_c/N_o$ (energy per chip of the pilot to the total received spectral density) must be less than a predetermined threshold (e.g., $-15$ dB).

Cellular communications systems have typically been conceptualized for analysis and planning purposes as a grid of hexagonal areas (cells) of substantially equal size disposed in a service area. A base transceiver station (BTS) having particular channels assigned thereto conceptually may be disposed in the center of a cell to provide uniform wireless communications throughout the area of the cell. Therefore, a grid of such cells disposed edge to edge in "honeycomb" fashion may be utilized for information with respect to the relative positions of a plurality of BTSs for providing wireless communications throughout a service area.

However, it should be appreciated that the communication coverage associated with a BTS typically varies substantially from the theoretical boundaries of the cell due to cell topology and morphology. For example, topological characteristics (mountains, valleys, etc.) and/or morphological characteristics (large buildings, different building heights, shopping centers, etc.) result in different path losses experienced in different azimuthal directions from the BTS. Accordingly, in practice homogeneous signal quality is not provided throughout the area of a cell.

Typically cells have been implemented as omni-trunks, where each cell is able to use each channel in the full 360° azimuth of a BTS, or sectored configurations, such as breaking the cells down into 120° sectors such that each cell channel communicates in the 120° azimuth an associated sector. However, because of the irregular boundaries experienced in actual cell implementations (e.g., path loss variance), a user moving about a cell and even a sector may experience a wide variety of communication conditions, including outage conditions (e.g., $E_c/N_o \geq -15$ dB) or poor quality of service. For example, this user may move only a few degrees in azimuth with respect to a BTS and experience significant signal quality degradation. Accordingly, this user may experience unacceptable communication conditions, such as the aforementioned outage conditions, when noise or interference levels are otherwise generally within acceptable limits for operation within the network.

Both the user's signal of interest, such as a serving pilot signal, and interference associated therewith are typically subject to log-normal shadowing. Accordingly, the communication conditions experienced are dependent on the variance of both.

It can therefore be appreciated that the capacity of the cell may be unnecessarily limited and/or the quality of communications provided thereby may be substandard if the quality of various signals of interest with respect to individual users is not maintained and/or interference energy is not controlled. A need therefore exists in the art for systems and methods which are adapted to provide a substantially uniform communication condition throughout an area, such as a cell or a sector of a cell.

SUMMARY OF THE INVENTION

The present invention is directed to a system and method which substantially equalizes communication system service area boundaries to thereby provide a substantially uniform communication condition throughout such service areas. Implementing aggressive cell sculpting according to the present invention, preferred embodiments change a cell footprint to provide a desired cell boundary in response to cell topology and/or morphology features. Preferably, aggressive cell sculpting according to the present invention remediates radial variance of signal communication within a cell, e.g., variance of communication conditions throughout various degrees of azimuth, to thereby provide increased communication capacity and/or improved quality of service. Moreover, implementation of preferred embodiments of the present invention includes careful cell planning to provide load balancing to increase communication capacity and/or improve quality of service.

A preferred embodiment of the invention utilizes antenna arrays having a relatively large number of antenna elements to provide aggressive beam sculpting. Such arrays are preferably coupled to a feed network providing desired signal manipulation, e.g., complex weighting of signals providing amplitude and/or phase relationships of signals associated with the antenna elements of the array, providing such beam sculpting.

Preferred embodiments of the present invention implement passive networks for providing aggressive beam sculpting, such as for sector beams of a cellular base station, to thereby provide cell boundary equalization. Feed networks utilized according to the present invention preferably comprise microstrip line and/or air-line busses, or other passive feed circuitry, which may be relied upon to conduct signals and provided desired manipulation of attributes thereof. For example, air-line transmission lines may be adapted to provide desired signal power splitting, such as through providing junctions having desired impedance relationships, and/or delays, such as through providing line lengths associated with desired amounts of propagation delay.

The preferred embodiment feed networks provide a "personality module" which may be disposed at the masthead or tower-top with the aforementioned antenna array to provide operation as described herein. Accordingly, operation as described herein may be provided without deploying expensive signal processing equipment and/or signal processing equipment sensitive to operation in such environments at the masthead. Moreover, preferred embodiments, implementing such a personality module, may be deployed without requiring change to a cell site shelter and without substantially affecting system reliability.

The present invention may be used with any air interface used in cellular and personal communication services (PCS) networks, such as air interfaces defined by the AMPS, IS-54, IS-136, IS-95, and GSM standards, to provide improved operation as described herein. Additionally, antenna arrays of the present invention may be used in conjunction with signal diversity techniques, such as transmit diversity, if desired.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
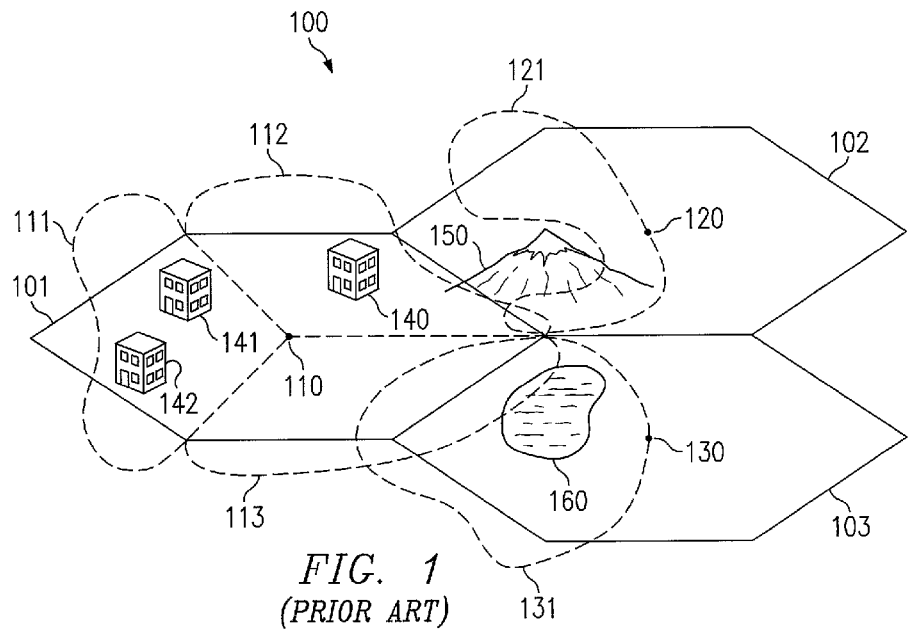
FIG. 1 shows coverage associated with a typical prior art cellular network as resulted from topological and morphological features.

As illustrated in FIG. 1, cellular communications systems have typically been conceptualized for analysis and planning purposes as a grid of hexagonal areas (cells) of substantially equal size disposed in a service area. For example, cells 101, 102 and 103 of FIG. 1 are identified with the areas of communication associated with base transceiver stations (BTSs) 110, 120, and 130, respectively. Accordingly, service area 100 is provided communication services throughout by "honeycombed" deployment of such cells.

However, the communication coverage associated with a BTS may vary substantially from the theoretical boundaries of the hexagonal cell due to cell topology and morphology.

For example, as shown in FIG. 1 cell 101 includes morphological features disposed therein. Accordingly, sector 112, having building 140 disposed therein, presents a contour appreciably different than the cell boundary the sector theoretically follows due to signal fading and/or shadowing associated therewith. Likewise, sector 111, having buildings 141 and 142 disposed therein, presents a contour appreciably different than the cell boundary that sector theoretically follows also due to signal fading and/or shadowing associated therewith. Similarly, cells 102 and 103 include topological features disposed therein. Accordingly, sector 121, having mountain 150 disposed therein, presents a contour appreciably different than the cell boundary due to a significant shadow cast by the mountain. Sector 131, having lake 160 disposed therein, presents a contour appreciably different than the cell boundary due to omission of attenuating structure associated with the lake.

Although no topological or morphological features are illustrated within sector 113 of cell 101, the contour of sector 113 is illustrated to blossom beyond the boundary of the cell boundary. It is often attempted to address such an area of overlap, to varying degrees of success, through the use of down-tilt at the sector antenna. Such down-tilt is generally applied to all sectors of a typical prior art cellular system in an attempt to minimize areas of overlap between the cells.

It should be appreciated that the topological and morphological features illustrated in FIG. 1 are simplified in order to aid in understanding the present invention. Accordingly, an actual cellular deployment may include topological and morphological features substantially more complex than those illustrated, such as including many more features in a cell and/or a sector as well as mixing both morphological and topological features. Moreover, it should be appreciated that all such features which affect the propagation of communicated signals are not represented. For example, features such as trees, valleys, highways, and the like may significantly impact the contour of a cell. Additionally, such features may change over time, such as seasonally as with deciduous trees.

It can readily be seen from FIG. 1 that there are outage areas (locations where service is not supported) within the cells. For example, due to the effects of signal shadowing, sector 121 does not fully cover a corresponding portion of cell 102. Moreover, areas of outage are typically defined with reference to noise energy and, therefore, are more extensive than initially apparent from FIG. 1. For example, in some cellular systems in common use today outage areas are determined as any area in which a particular pilot $E_c/N_o$ (energy per chip of the pilot to the total received spectral density) is less than a predetermined threshold, such as −15 dB. Accordingly, areas having high noise characteristics, such as the areas where sectors 112 and 121 overlap and where sectors 112 and 131 overlap, in addition to areas where a particular signal of interest receive strength is relatively low, may experience outage conditions. Moreover, both the user's signal of interest, such as a serving pilot signal, and interference associated therewith are typically subject to log-normal shadowing. Accordingly, the communication conditions experienced are dependent on the variance of both.

Because of the irregular boundaries experienced in actual cell implementations (e.g., path loss variance), a user moving about a cell and even a sector may experience a wide variety of communication conditions, including the aforementioned outage conditions, or poor quality of service. In CDMA networks, in particular, performance is directly related to interference control and, therefore, such path loss variances may significantly impact performance. GSM protocols have been migrating into the spread spectrum arena by adopting frequency hopping, bringing GSM systems closer to CDMA system characteristics (frequency reuse factor of 1). Accordingly, GSM networks are prone to appreciable performance degradation associated with path loss variance. For example, the user may move only a few degrees in azimuth with respect to a BTS and experience significant signal quality degradation.

However, the outage areas and areas in which poor signal quality is experienced are typically to be minimized in a communication network. For example, typical network designs strive to provide networks in which outage areas are not more than 2% of the network service area. Accordingly, such network designs often include the use of antenna down-tilt (i.e., directing the broadside of an antenna array a few degrees toward the ground) in an attempt to minimize areas of overlap between adjoining cells. However, such prior art techniques provide only limited success as they are not fully responsive to cell topology and morphology features.

Accordingly, preferred embodiments of the present invention implement aggressive cell sculpting to change a cell footprint and provide a desired cell boundary in response to cell topology and/or morphology features and may be used with a variety of air interfaces, such as air interfaces defined by the AMPS, IS-54, IS-136, IS-95, and GSM standards. Preferably, cell sculpting according to the present invention provides air link signals adapted with respect to the particular path loss differentials experienced and, therefore, provides a reduction of the average signal energy within a cell. Such reduction of average transmit power required to support air links or connections will directly contribute to capacity increase, in addition to minimizing pilot pollution and the soft handoff rate allowing for greater network robustness and reduced resource usage.

Figure 2:
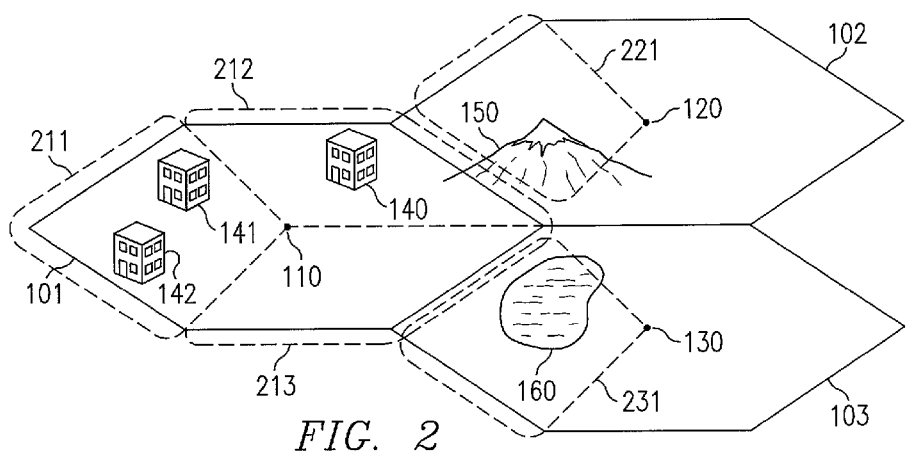
FIG. 2 shows the result of cell sculpting in response to equalization according to the present invention.

Directing attention to FIG. 2, the cells of FIG. 1 are shown having benefit of the present invention to provide cell boundaries more consistent with that of the theoretical hexagonal cells. Preferably, cell sculpting according to the present invention remediates the radial variance of signal communication shown in FIG. 1. Accordingly, the cell sculpturing of FIG. 2 provides contours of illustrated sectors 211, 212, 213, 221, and 231 substantially consistent with the corresponding cell boundaries, despite the topological and/or morphological features disposed therein. For example, where the path loss angular profile is known (e.g., derived from a cell footprint), an antenna pattern can be formed such that path loss and antenna gain summed (as a function of azimuth) provide a substantially consistent result throughout the azimuth of an antenna beam sculpted according to the present invention. Stated another way, Path Loss+Antenna Gain (as function of azimuth) Variance is minimized.

Path loss angular profile information useful in providing cell sculpting according to the present invention may be acquired in a variety of ways. For example, drive test information may gathered to empirically determine angular profile information, or some portion thereof. Additionally or alternatively, direction finding information and communication link attributes, such as receive signal strength, carrier to noise ratio, and the like, may be utilized in determining angular profile information. For example, GSM reverse link characteristics (hopping sequence, training sequence, etc.) are well known to the operator and, therefore, traffic loading as a function of azimuth may be determined using a simple radio direction finding system therewith. This information may be used according to the present invention to determine cell site beam shaping.

For example, energy radiated from a sector antenna array of BTS 110 may provide sufficient energy in the azimuthal direction corresponding to building 140 to remediate a shadowing affect associated therewith. Likewise, energy radiated from a sector antenna array according to the present invention may provide energy directed such that multi-path and shadowing effects associated with buildings 141 and 142 are remediated. A sector antenna array of the present invention may further provide energy radiation adapted to remediate the shadowing effects of mountain 150, including providing increased antenna gain in corresponding directions of the azimuth, and propagation effects of lake 160, such as providing decreased antenna gain in corresponding directions of the azimuth.

It should be appreciated that, although described above with reference to signals radiated from the BTSs (i.e., the forward link), cell sculpting of the present invention may be utilized in any link direction, whether forward or reverse links, and with communication systems other than the preferred embodiment BTSs. Moreover, although discussed with reference to sector antenna arrays, the present invention is not limited to use with sector antenna arrays or even with sectorized systems. Similarly, operation of the present invention is not limited to use of either the 120° sectors or sectors of equal size shown in the illustrated embodiment. For example, cell sculpting according to the present invention may provide cells and/or sectors of unequal size and/or shape, or otherwise specifically adapted, to provide load balancing to increase communication capacity and/or improve quality of service.

In providing cell sculpting according to the present invention, desired cell contours are preferably provided using aggressive antenna beam shaping techniques. Accordingly, the use of antenna down-tilt to define a cell's boundaries may be limited or avoided. For example, a particular cell's boundary configuration, topological features, and/or morphological features may provide a situation in which particular portions of the azimuth should be substantially restricted in outboard reach (e.g., in prior art systems a substantial amount of antenna down-tilt applied to avoid cell boundary overlap) whereas other portions of the azimuth should be substantially extended in outboard reach (e.g., in prior art systems a minimal amount of antenna down-tilt applied to fully cover a portion of the cell). According to the present invention, the contour of the cell is sculpted in response to the situation experienced and, therefore, the degrees of azimuth may be substantially individually addressed, unlike prior art applications of down-tilt which affect a sector substantially equally throughout its azimuth. For example, sector 221 of FIG. 2 may be provided with no down-tilt in order to better eliminate the shadowing effects of mountain 150 while still maintaining a proper contour with respect to portions of the sector not substantially affected by mountain 150.

Accordingly, it should be appreciated that cell footprints can be "smoothed" according to the present invention to become as close as possible to the theoretical hexagon, or other desired shape, as shown in FIG. 2. This "spatial equalization" can provide for such advantages as outage reduction, allowing for higher loading and increased network capacity, reduced signal "penetration" from one cell to another, thereby reducing pilot pollution, reducing the expected number of pilots that exceed the "TADD" threshold, thereby reducing soft handoff rate, and reduced probability of low regions within the cell, thereby increasing the cell capacity.

The sculpturing capability, or the resolution of the azimuthal contouring, is typically related to a number of elements in the array. To significantly change the cell footprint, antenna arrays utilized according to the present invention should have sufficient numbers of antenna elements (in the preferred embodiment, columns) allowing aggressive beam synthesis. Therefore, the present invention preferably utilizes antenna arrays having a relatively large number of antenna elements, whether disposed in a linear or curvilinear configuration, to provide aggressive beam sculpting, such as may be utilized to address topological and morphological features to result in desired cell contours such as illustrated in FIG. 2. For example, antenna arrays provided in panel or conic configurations such as shown and described in the above referenced patent application entitled "Dual Mode Switched Beam Antenna" and in commonly owned U.S. Pat. No. 6,188,272 entitled "System and Method for Per Beam Elevation Scanning," the disclosure of which is hereby incorporated herein by reference, may be utilized according to the present invention. The use of curvilinear arrays may be advantageous in particular situations due to the ability to typically generate wider beams (e.g., 200° beam widths) with such arrays.

Figure 3A:
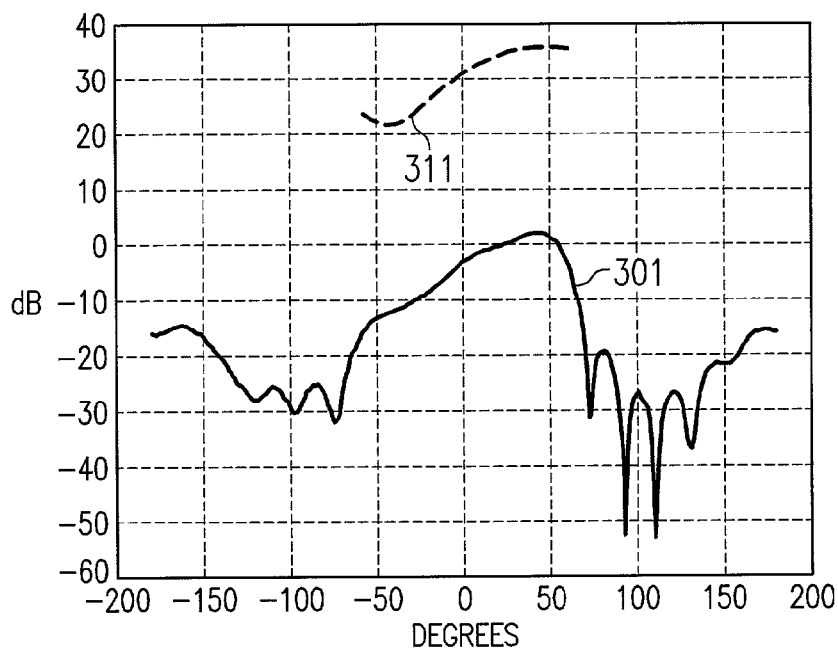
FIGS. 3A–G show various examples of beam shaping achievable according to the present invention.
Figure 3B:
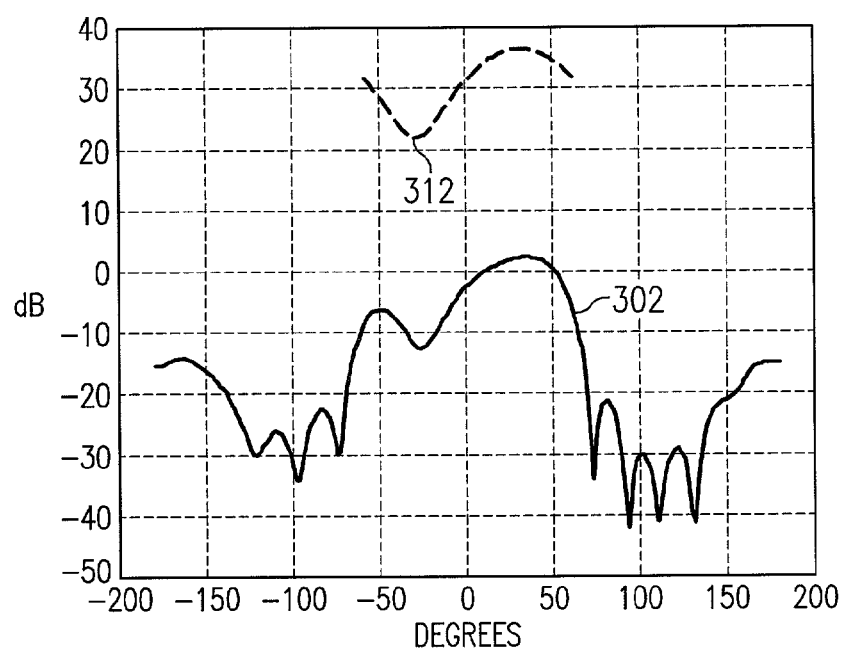
Figure 3C:
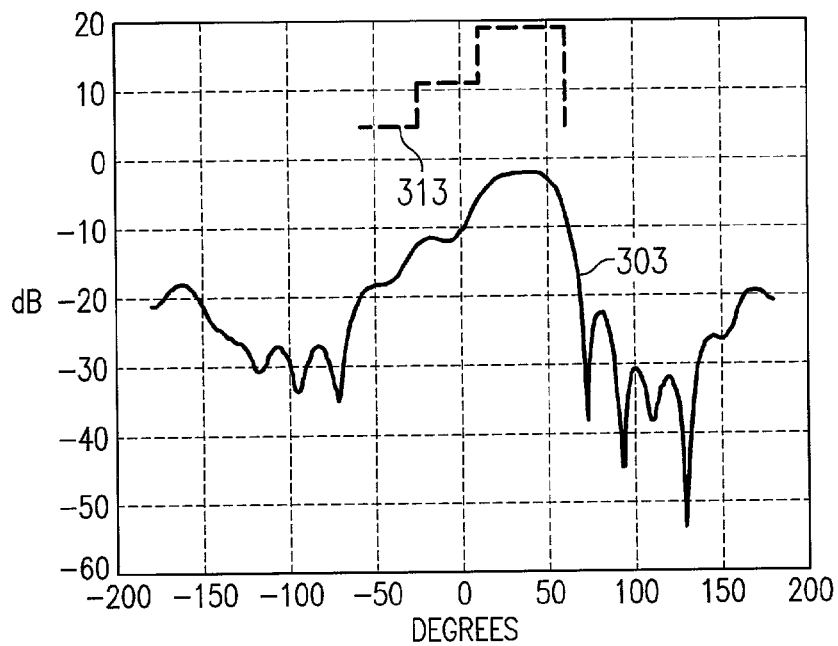
Figure 3D:
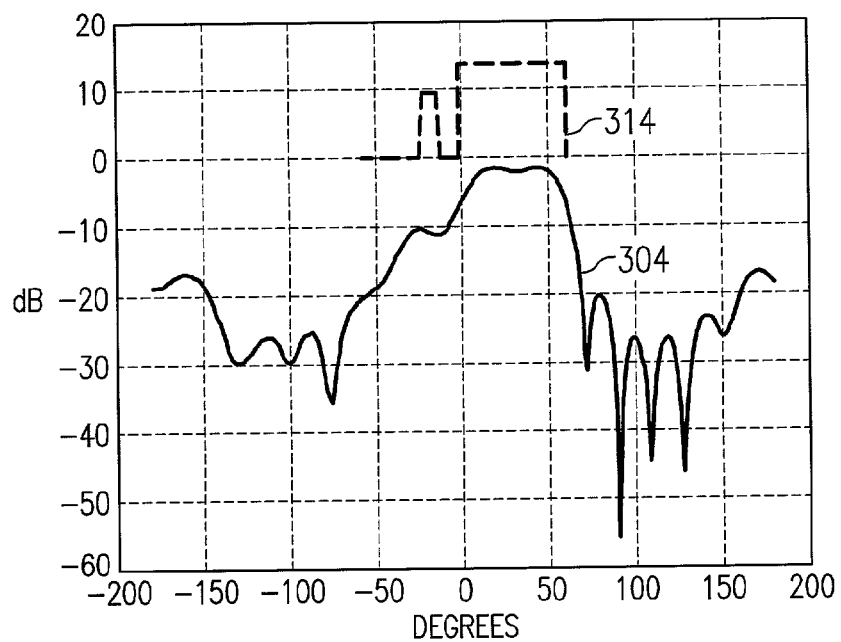
Figure 3E:
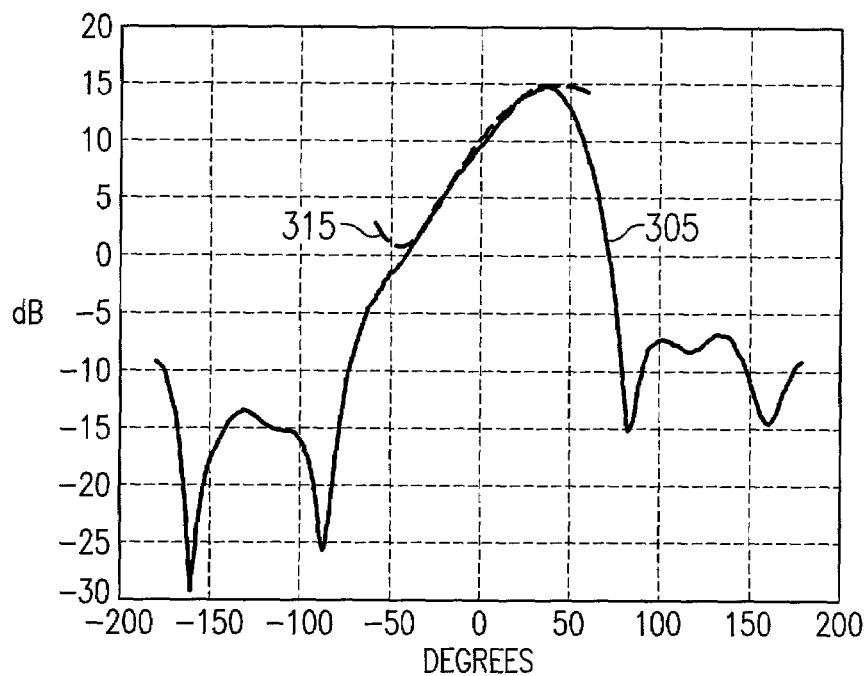
Figure 3F:
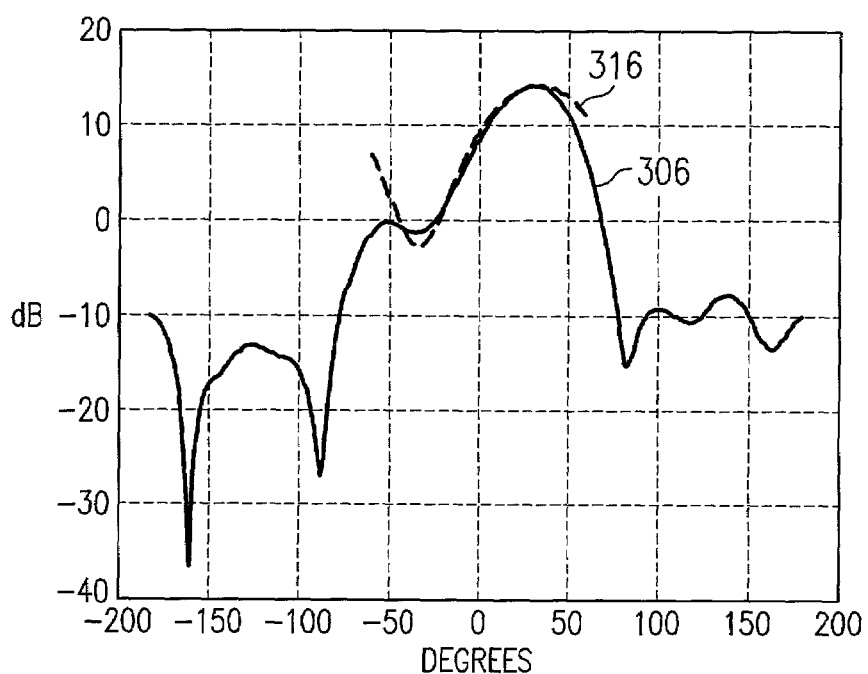
Figure 3G:
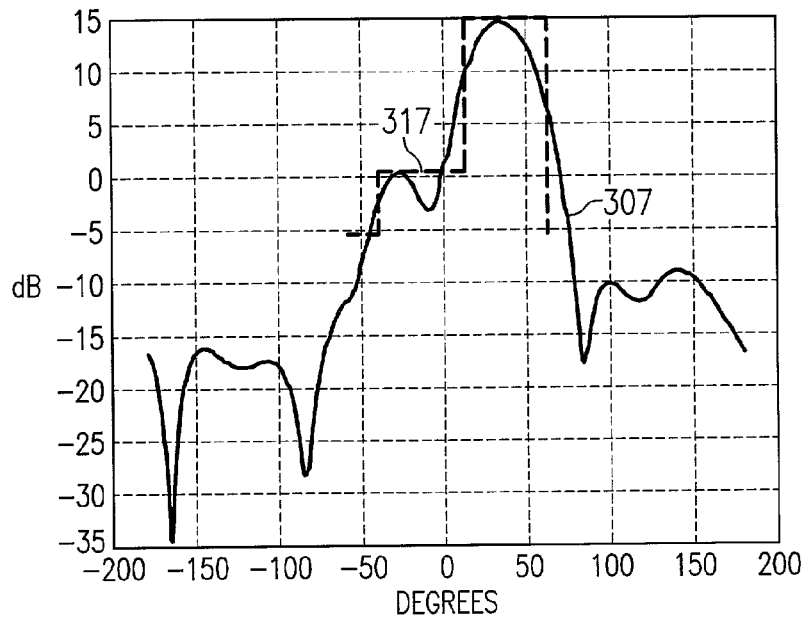

Directing attention to FIGS. 3A–3G, examples of beam sculpting to provide attributes responsive to hypothetical topological and/or morphological features are shown. In each of FIGS. 3A–3G, the upper curve (311–317 respectively) represents the desired radiation pattern attributes, responsive to the aforementioned topological and/or morphological features, and the lower curve (301–307 respectively) represents the simulated results using a particular antenna array according to the present invention. FIGS. 3A–3D provide examples of curvilinear array beam sculpturing and FIGS. 3E–3G provide examples of linear array beam sculpturing. Specifically, FIGS. 3A–3D provide simulation results for beam sculpturing according to the present invention using a semi-circular array having 17 antenna columns spaced equidistant with respect to one another. FIGS. 3E–3G provide simulation results for beam sculpturing according to the present invention using a flat panel array having 8 columns spaced equidistant with respect to one another.

Antenna arrays utilized according to the present invention are preferably coupled to a feed network providing desired signal manipulation, e.g., complex weighting of signals providing amplitude and/or phase relationships of signals associated with the antenna elements of the array, to provide the above described beam sculpting. It should be appreciated that typical prior art beam shaping solutions, such as those using adaptive beam forming responsive to a mobile unit's position, utilize a beam-forming device requiring a significant amount of hardware (LPAs, controllable phase shifters, etc.), some or all of which are not well suited for deployment at a masthead or tower-top with an antenna array, which adds to the expense and/or complexity of such systems. Preferred embodiments of the present invention implement passive networks for providing aggressive beam sculpting thereby allowing low cost use of many elements, allowing aggressive sculpting, to thereby provide cell boundary equalization. Such embodiments may be deployed at the masthead as part of the antenna array assembly. This arrangement relieves the need for a large amount of hardware as mentioned above and, hence, allows for larger number of antenna elements in the array as required for aggressive sculpturing.

Preferred embodiment feed networks utilized according to the present invention comprise microstrip line and/or air-line busses which may be relied upon to conduct signals and provided desired manipulation of attributes thereof. For example, air-line transmission lines may be adapted to provide desired signal power splitting, such as through providing junctions having desired impedance relationships, and/or delays, such as through providing line lengths associated with desired amounts of propagation delay. Preferred embodiment feed networks provide a "personality module" which may be disposed at the masthead with the antenna array to provide operation as described herein.

The concepts applicable to providing a preferred embodiment passive personality module are provided below with respect to implementation using a beam shaping network based on micro strip lines design. However, it should be appreciated that the personality module described is for illustrative purposes only and is not intended to limit the present invention to the configuration described.

In providing preferred embodiment personality modules according to the present invention, the system designer is presented with a need to distribute seemingly arbitrary power and phase to specific loads. For the purposes of the illustrative embodiment, it will be assumed that these loads can represent the drive point impedance of a column of dipole antennas or at the column these loads can represent the individual dipoles themselves. Additionally, it will be assumed that a typical 50 Ω coaxial line is used to deliver radio frequency (RF) energy from some generator to an air-line transmission line, wherein an air-line is substantially identical to a microstrip transmission line with the special condition that the dielectric between the microstrip and the ground plane is in fact air.

Figure 4:
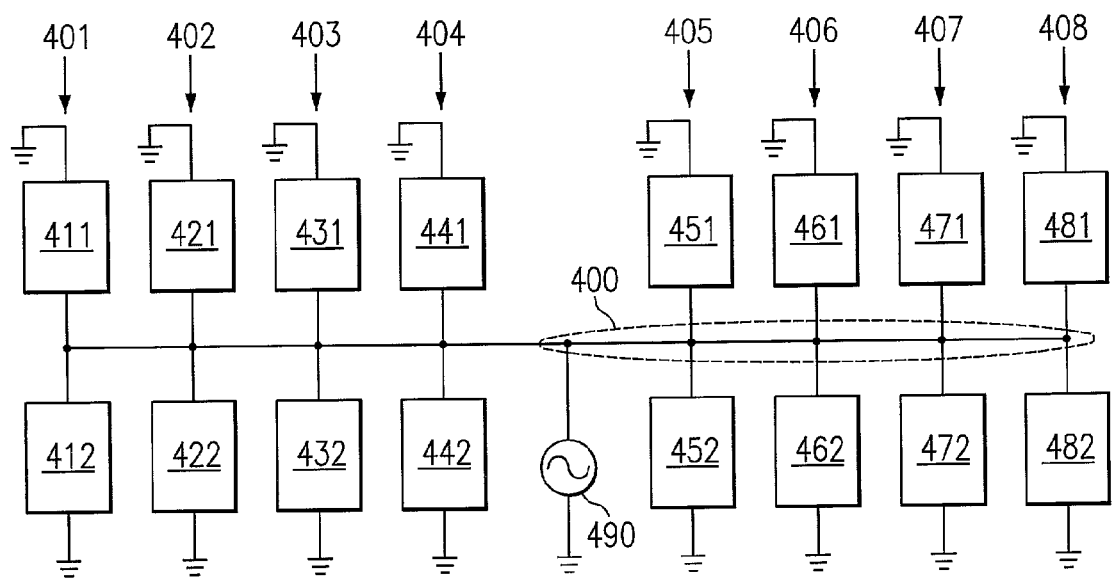
FIG. 4 shows a schematic diagram of an exemplary antenna array beam forming network as may be provided as a personality module according to the present invention.

A very simple example of a power and phase distribution network for use with 16 loads is shown in FIG. 4. Specifically, FIG. 4 shows columns 401–408, including loads 411 and 412, 421 and 422, 431 and 432, 441 and 442, 451 and 452, 461 and 462, 471 and 472, and 481 and 482 respectively, coupled to generator 490. Columns 401–408 may correspond to antenna element columns of 2 antenna elements each (loads 411, 412, 421, 422, 431, 432, 441, 442, 451, 452, 461, 462, 471, 472, 481, and 482) forming a linear or curvilinear array for communicating an RF signal associated with a transceiver (generator 490). It should be appreciated that the distribution network shown in FIG. 4 illustrates a symmetric load which, depending upon topological and/or morphological features of the service area actually served, may not be the case. However, it is believed that a discussion of providing a passive feed network according to the present invention to a simple symmetric load will more readily allow an understanding of the concepts presented and facilitate their application to feed networks providing aggressive beam sculpting according to the present invention.

In the exemplary scenario, it is assumed that the cell topology and morphology suggest that, according to the present invention, one Watt per load, all at the same phase, should be delivered in this system to provide a desired cell contour. Because the load is symmetrical, a first side of the feed assemblage (feed network portion 400) will be discussed herein, with the understanding that the same design considerations apply to the second side of the feed assemblage.

Figure 5:
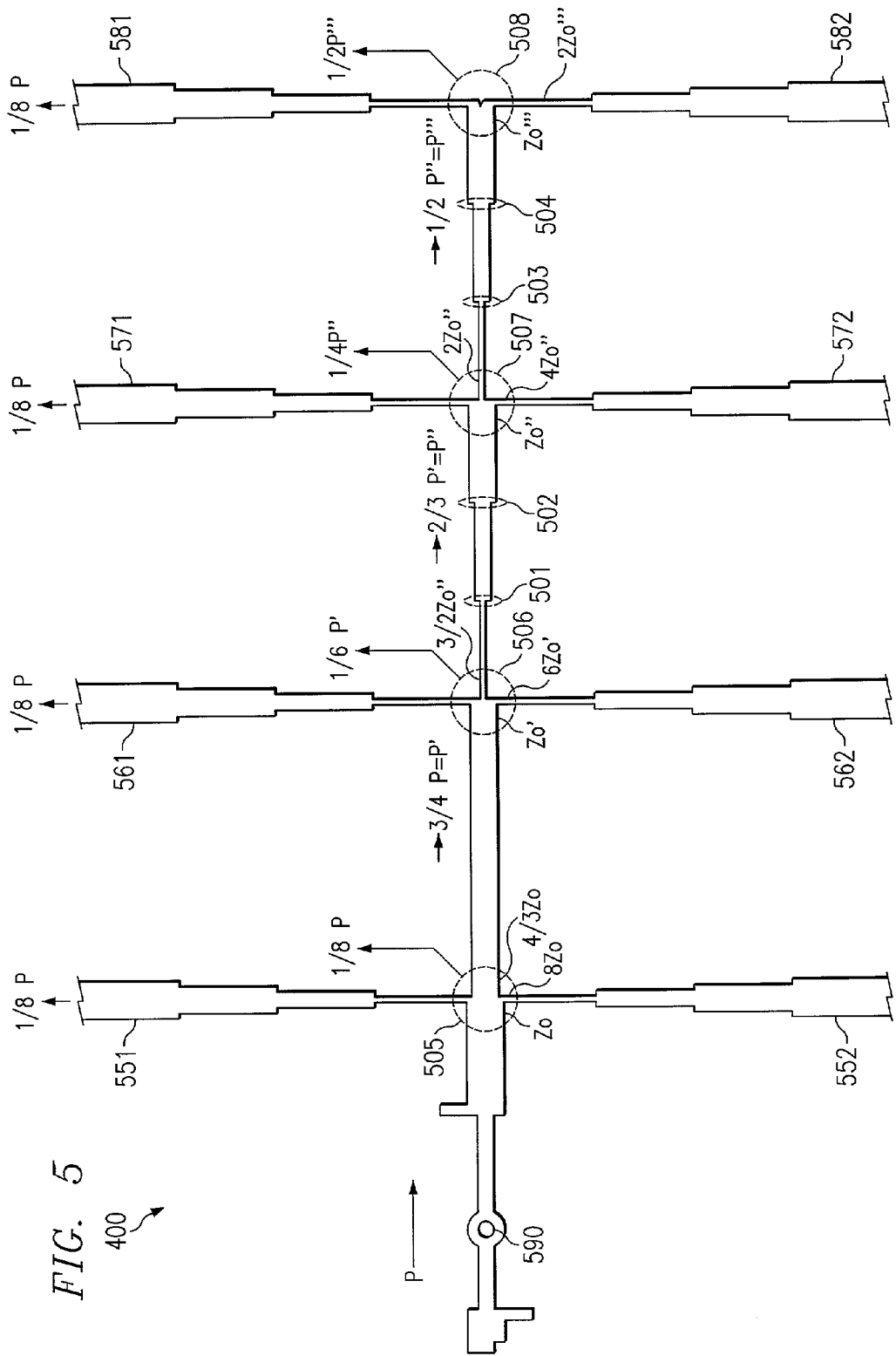
FIG. 5 shows a preferred embodiment implementation of a portion of a passive personality module of the present invention.

Directing attention to FIG. 5, feed network portion 400 is shown in a preferred embodiment microstrip pattern, where center junction 590 preferably couples to generator 490 and transmission line ends 551, 552, 561, 562, 571, 572, 581, and 582 preferably couple to loads 451, 452, 461, 462, 471, 472, 481, and 482 respectively. It should be appreciated that relative widths of the microstrip pattern are approximated in the illustration in order to show the preferred embodiment impedance ratios utilized in passively distributing power for antenna beam shaping.

In the example, it is desired to provide equal power (1 Watt) to all loads, accordingly center junction 590 provides 2 microstrip lines of equal size (equal impedance) to thereby provide a power splitter equally dividing power between the first feed network portion and the second feed network portion. For example, where generator 490 provides an RF signal of 2P Watts (in the example 2P=16) to center junction 590, an approximately 1P Watt (in the example P=8) RF signal will be provided to feed network portion 400.

Power splitting is also provided at each of junctions 505, 506, 507, and 508 to thereby provide a desired amount of power (in the example 1 Watt) to corresponding ones of the 5 loads. For example, at junction 505 microstrips having particular relative sizes are illustrated in FIG. 5 extending up, down, and to the right. The up and down portions of junction 505 lead to ends 551 and 552 respectively, where it is desired to deliver ⅛ of the power available at this junction to the loads coupled thereto. Accordingly, the impedance associated with the up portion of junction 505 (Zu) is 8 times the impedance of the supplying microstrip (Zo). Similarly, the impedance associated with the down portion of junction 505 (Zd) is 8 times the impedance of the supplying microstrip (Zo). It should be noted that the ratio of line impedance is the reciprocal of the desired power distribution, e.g., ⅛ P is related to 8Zo. As ¼ of the power of the signal input at junction 505 has been distributed in the up (⅛ P) and down (⅛ P) portions thereof, ¾ of the power remains for transmission to junction 506. Accordingly, the impedance ratio of the right portion of junction 505 is ⁴⁄₃ Zo.

At junction 506 microstrips having particular relative sizes are again illustrated. Defining P' to be ¾ P and Zo' to be the impedance of the microstrip coupling junctions 505 and 506, an impedance relationship as described above with respect to junction 505 can be appreciated. Specifically, in the illustrated example, P' (¾ P), or 6 Watts, is provided to junction 506 for supplying ⅙ P' (⅛ P), or 1 Watt, to ends 561 and 562 corresponding to up and down portions of junction 506 and, accordingly, the up and down portions of junction 506 are provided an impedance of 6Zo'. Correspondingly, the impedance associated with the right portion of junction 506 is 3/2 Zo', corresponding to the transmission of ⅔ P' (½ P).

It should be appreciated that the right portion of the microstrip leaving junction 506 is relatively thin due to the reductions in size associated with power splitting at junctions 505 and 506. Accordingly, it may be desirable to increase the size of the microstrip, such as to avoid its behaving as a fuse link, in coupling junctions 506 and 507. The illustrated embodiment includes quarter wave transitions 501 and 502 to increase the microstrip line thickness. The use of quarter wave transitions 501 and 502 do not alter the power distribution at junction 506 due to their disposition at the quarter wave position in the transmission line. It should be appreciated that, in addition to providing a microstrip coupling junctions 506 and 507 which has been substantially increased in size, the use of the preferred embodiment quarter wave transitions provide an input impedance at junction 507 more amenable to the impedance ratios of the preferred embodiment.

At junction 507, P''' is defined to be ⅔ P'' (½ P) and Zo'' is defined to be the impedance of the microstrip coupling junctions 506 and 507. Accordingly, in the illustrated example, P'' (½ P), or 4 Watts, is provided to junction 507 for supplying ¼ P''' (⅛ P), or 1 Watt, to ends 571 and 572 corresponding to up and down portions of junction 507 and, accordingly, the up and down portions of junction 507 are provided an impedance of 4Zo''. Correspondingly, the impedance associated with the right portion of junction 507 is 2 Zo'', corresponding to the transmission of ½ P''' (¼ P).

The right portion of the microstrip leaving junction 507 is again relatively thin due to the reduction in size associated with power splitting. Accordingly, the illustrated embodiment includes quarter wave transitions 503 and 504 to increase the microstrip line thickness connecting junctions 507 and 508.

At junction 508, P'''' is defined to be ½ P''' (¼ P) and Zo''' is defined to be the impedance of the microstrip coupling junctions 507 and 508. Accordingly, in the illustrated example, P''' (¼ P), or 2 Watts, is provided to junction 508 for supplying ½ P''' (⅛ P), or 1 Watt, to ends 581 and 582 corresponding to up and down portions of junction 508 and, accordingly, the up and down portions of junction 508 are provided an impedance of 2 Zo''. As all power provided to junction 508 is to be provided to loads corresponding to the up and down portions, there is no right portion of junction as is provided in junctions 505, 506, and 507.

Although the illustrative embodiment provides equal power distribution, it will be readily appreciated that changes in the impedance ratios corresponding to the desired changes in power distribution may be utilized in providing antenna beams having a different shape than the embodiment represented in the illustration. Likewise, although in phase signals are provided to the loads in the illustrated embodiment, it will be readily appreciated that microstrip line lengths may be altered (e.g., lengthened with respect to one load to provide a phase delay relative to another load) to provide a desired phase progression utilized in providing antenna beams having a different shape than the embodiment represented in the illustration.

The above example has been discussed with respect to changing microstrip line widths in order to provide the desired impedance ratios. However, it should be appreciated that microstrip line impedance is not only a function of line width, but also of substrate thickness, dielectric constant and thickness of the conductor. Accordingly, any or all of such microstrip line attributes may be altered in providing impedance ratios according to the present invention. For example, different dielectric materials may be introduced at various portions of the junctions in order to provide a desired impedance ratio, if desired.

It should be appreciated that, in providing a feed network according to the preferred embodiment, microstrip line lengths may be desired which are physically longer than a distance to be traversed by the line. For example, in feeding antenna elements or columns of a curvilinear array, the antenna element or antenna column feed point along the curvilinear ground could be less than a quarter wavelength. Similarly, in providing a desired amount of phase shift, a transmission line may be desired which is longer than the distance between antenna elements or antenna columns. Accordingly, various microstrip configurations may be utilized according to the present invention to provide desired transmission characteristics.

Figure 6A:
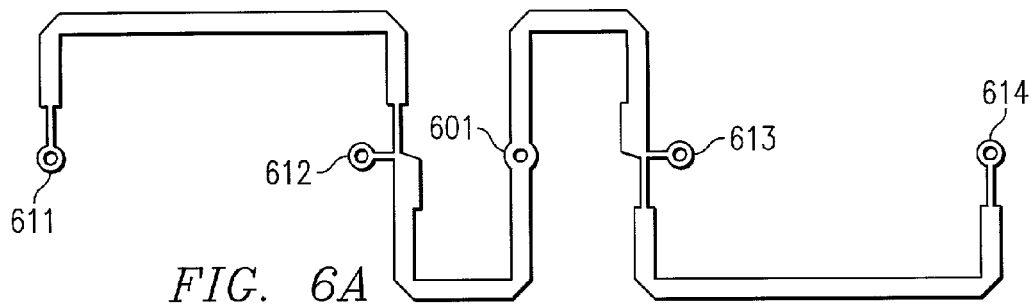
FIGS. 6A and 6B shows alternative configurations for portions of a passive personality module of the present invention.
Figure 6B:
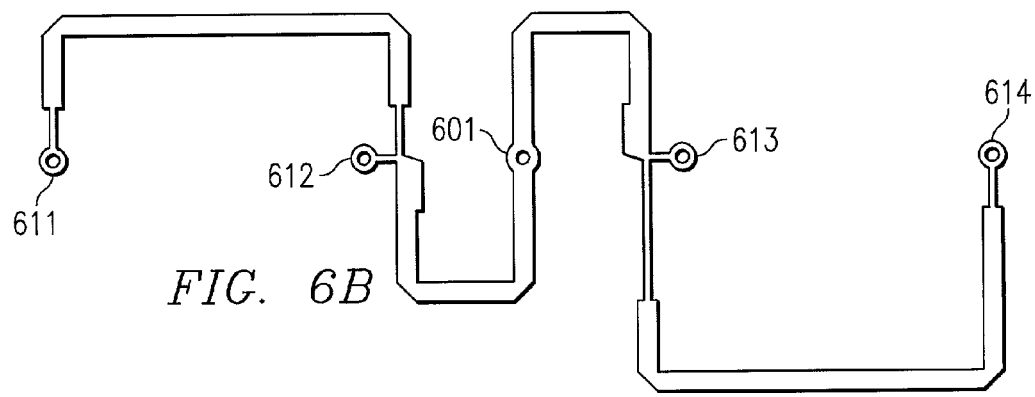

Directing attention to FIGS. 6A and 6B, the use of "zigzag" microstrip configurations to provide desired transmission line lengths is shown. Specifically, junctions 601, and 611–614 are shown disposed along a microstrip transmission line. Junction 601 may, for example, be a connection point for a signal generator or receiver. Junctions 611–614 may, for example, provide connection to antenna elements or antenna columns of a panel or curvilinear array. Because the locations of junctions 611–614 in the illustrated embodiment are determined by the physical attributes of the antenna, it may be desired to provide a transmission line longer than spacing there between. Accordingly, the microstrips of FIG. 6A are provided with bends to provide extended transmission line lengths between the junction coupling points. For example, the microstrip lines coupling junction 601 with junctions 612 and 613 may be provided in a length which is a function of the transmitted signal half wavelength whereas the microstrip lines coupling junctions 611 and 612 and junctions 613 and 614 may be provided in a length which is a function of the transmitted signal full wavelength.

Using such a technique, the microstrip lines may be formed with any desired length to thereby provide desired phase relationships. For example, referring to FIG. 6B, the microstrip coupling junctions 613 and 614 may be extended to provide a phase delay in the signal provided to junction 614, if desired.

A cellular network using aggressive cell sculpting, such as may be provided using the preferred embodiment passive feed networks discussed above, was simulated to determine the effect of implementation of the present invention with respect to network conditions which might typically be expected. Specifically, a two-tier, 19 cell network was computer modeled assuming an exponential path loss exponent of 4, which is a typical value for a very dense urban environment. In deriving the simulation results, a very large number of locations were randomly chosen inside the center cell of the aforementioned 19 cell network, and signals to each such location from all the base stations were shadowed. The standard deviation of the log-normal shadowing (path loss variance) was varied in the simulation between 0 to 10 dB, where shadowing has been found to vary between 8 to 10 dB in such networks not implementing the present invention. Specifically, the shadowing in the simulation was varied as a function of angle because of the preferred embodiment's approach of equalizing the gains as a function of the azimuthal angle. Accordingly, the simulation results are discussed herein with respect to relative gain associated with such angular equalization.

It should be appreciated that one of the most important quality of service (QOS) measurements is the percentage of cell area with proper coverage. The area of such coverage within a cell may be quantified by measuring communication characteristics, such as the receive parameter $E_c/I_0$ (ratio of the energy per chip of the pilot channel to the total received spectral density), at locations within the cell. For example, in IS-95 CDMA communication systems the $E_c/I_0$ parameter as measured at a receiver should be greater than −15 dB if adequate communication links are to be provided. Accordingly, in many systems if $E_c/I_0$<−15 dB, receiving systems, such a mobile subscriber units, are unable to demodulate a signal and, therefore, a coverage hole or outage is present at that location.

The above mentioned receive parameter $E_c/I_0$ may be determined as follows:

$$\frac{E_c}{I_o} = \frac{f_{pilot} \cdot G_{antenna} / (X_{path\_loss} \cdot 10^{\sigma \cdot X_s/10})}{I_0} \quad (1)$$

where,
$f_{pilot}$=Fraction of the total power on the pilot channel;
$G_{antenna}$=Gain of the BTS antenna;
$X_{path\_loss}$=Distance related path loss;
$X_s$=log-normal shadowing random variable;
$\sigma$=Standard deviation of the shadowing (in dB); and
$I_0$=Total received power.

The above mentioned total power $I_0$ may be determined as follows:

$$I_0 = \sum_{\forall all cells} L^i / (X^i_{path\_loss} \cdot 10^{\sigma \cdot X^i_s/10}) + N_{thermal}$$

where,
$L^i$=loading of cell i; and
$N_{thermal}$=Thermal noise.

In deriving the simulation results, the $E_c/I_0$ for all the base transceiver stations (BTS) associated with the aforementioned 19 cells were measured at each of the randomly selected locations. The BTS with the highest $E_c/I_0$ was assumed to be the BTS providing communication to that location. Additionally, each BTS was assumed to be equally loaded, i.e., the percentage of the maximum permissible power being transmitted by the BTSs was assumed to be the same for all 19 BTSs. Loading may be thought of in the following relationship: Loading=Overhead+(Number of subscribers*average power of each subscriber).

Figure 7:
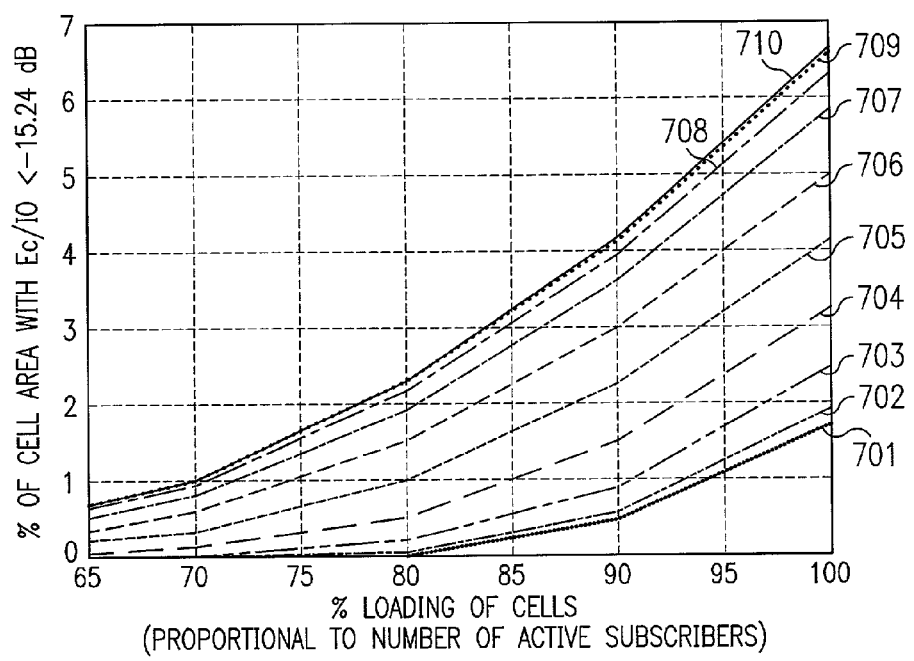
FIG. 7 shows simulated results of outage verses loading for various foot print radius variances.

FIG. 7 shows a graph of the simulation results presented as percentage of the cell area experiencing outage conditions ($E_c/I_0$<−15 dB) verses percent loading of the cells. The different lines of FIG. 7 present the simulation results for particular values of the shadowing standard deviation simulated. Specifically, lines 701–710 present the results for 1–10 dB of shadowing standard deviation, respectively.

In a system where 2% outage is acceptable and wherein 9 dB of standard deviation of the shadowing is experienced (as is often encountered in systems not implementing the present invention), it can be seen from line 709 that the maximum loading for the system is 78%. However, if by using cell sculpting according to the present invention the standard deviation of the shadowing is reduced to 4 dB, then it can be seen from line 704 that the maximum loading for the system is increased to approximately 93%. Accordingly, the capacity gain for implementation of the present invention in such a system is (93−78)/78=20% or 0.8 dB.

Figure 8:
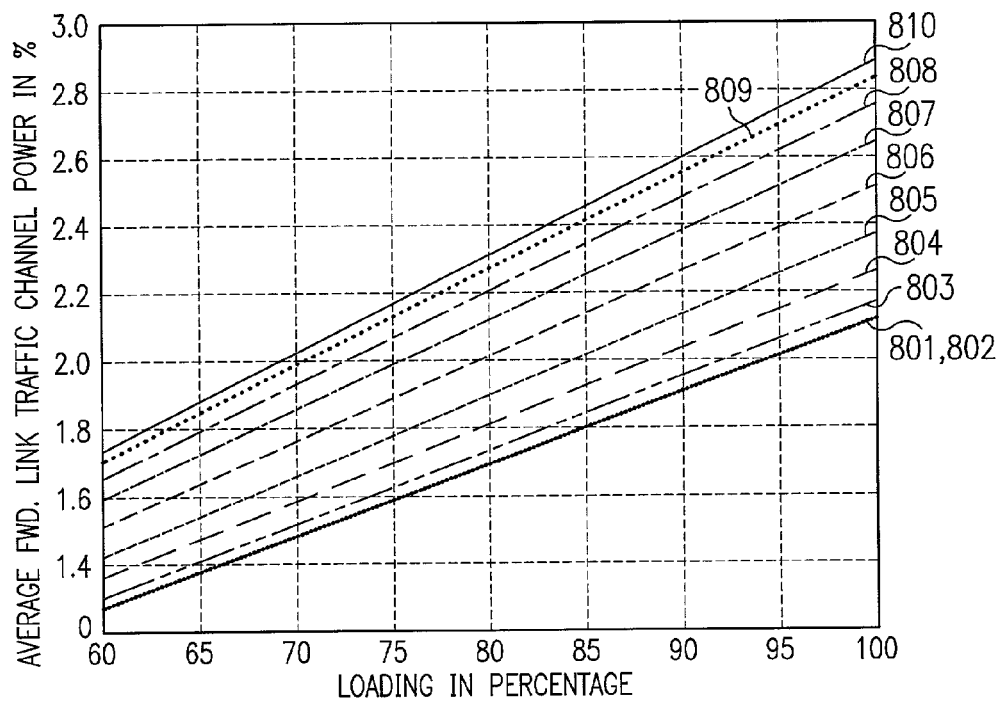
FIG. 8 shows simulated results of traffic channel power verses loading for various foot print variance values of the present invention.

It should be appreciated that the present invention provides additional gain due to the decrease in the average required traffic channel power associated with the decrease in the standard deviation of the shadowing. The transmit power trends are shown in FIG. 8, wherein a graph of the average forward link traffic channel power as a percentage of the total available power versus percent loading of the cells is provided for particular values of the shadowing standard deviation. Specifically, lines 801–810 (it being appreciated that lines 801 and 802 substantially overlap) present the transmit power trends for 1–10 dB of shadowing standard deviation, respectively.

Combining the results of FIGS. 7 and 8, a graph of the maximum possible subscribers for given loading may be derived. Directing attention to FIG. 9, graphs of the maximum number of subscribers verses percentage of the cell area experiencing outage conditions for particular values of the shadowing standard deviation are shown. Specifically, lines 901–910 present the maximum subscriber information for 1–10 dB of shadowing standard deviation, respectively.

Figure 9:
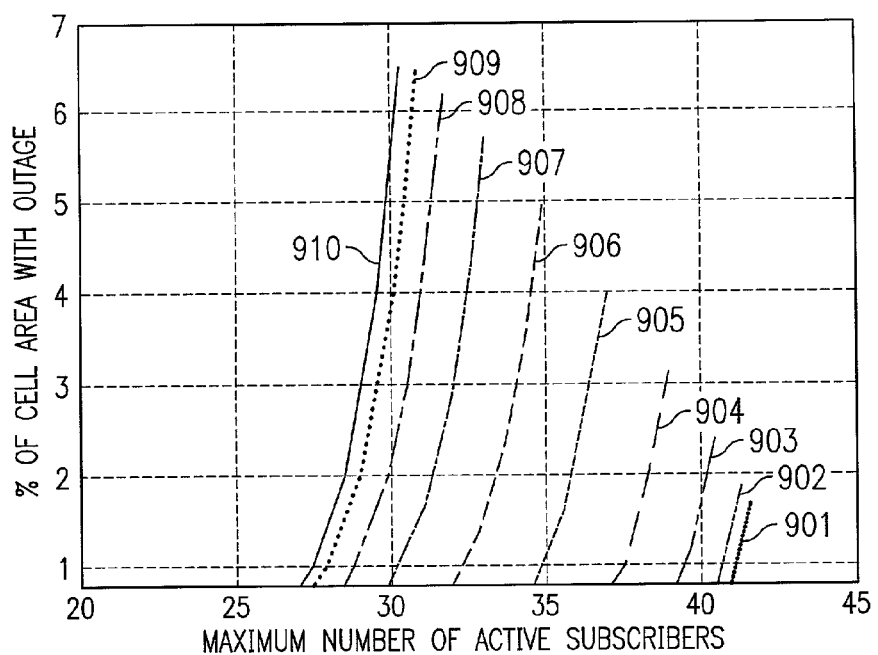
FIG. 9 shows simulated results of outage verses active subscribers for various foot print variance values of the present invention.

Reading FIG. 9, in a system where 2% outage and 9 dB of standard deviation of the shadowing are experienced, it can be seen from line 909 that the maximum number of active subscribers is 29. However, if by using cell sculpting according to the present invention the standard deviation of the shadowing is reduced to 4 dB, then it can be seen from line 904 that the maximum number of subscribers may be increased to approximately 38. Accordingly, further capacity gain associated with implementation of the present invention in such a system of (38−29)/29=31% or 1.17 dB is achieved.

It should be appreciated from the above that traffic load balancing may be a major source of capacity improvement. Subscribers' angular distribution typically depends heavily upon morphology (buildings, malls, freeways, etcetera) which are often beyond the control of the network designer. Morphology typically does not change very rapidly and, therefore, it is expected that a cell's loading at busy hours (when communication activity is at its peak) is relatively stable over time (although exceptions are possible, such as recreation areas between summer and winter).

To assess the long-term behavior of traffic load, two cellular markets were analyzed; the San Jose, Calif. market and the Atlanta, Ga. market. For each market only three sector cells were considered. To assess traffic change the statistical distribution of traffic as measured by code usage was analyzed. Defining $T_\alpha[k,n]$, $T_\beta[k,n]$, and $T_\gamma[k,n]$ to indicate for the kth cell in the network the nth month busy hour average levels of code usage for the alpha, beta, and gamma sectors respectively. The relative traffic loading is then defined for $\alpha$, $\beta$, and $\gamma$ sectors as:

$$R_\alpha[k,n] = \frac{T_\alpha[k,n]}{T_\alpha[k,n] + T_\beta[k,n] + T_\gamma[k,n]} \times 100$$

$$R_\beta[k,n] = \frac{T_\beta[k,n]}{T_\alpha[k,n] + T_\beta[k,n] + T_\gamma[k,n]} \times 100$$

$$R_\gamma[k,n] = \frac{T_\gamma[k,n]}{T_\alpha[k,n] + T_\beta[k,n] + T_\gamma[k,n]} \times 100$$

If n=0 is defined as the reference month, the level of change may be determined by comparing the deviation from the reference as time progresses. For example, the change in the peak sector of the kth cell over a 6 month period is, % Change=|$R_x[k,6]-R_x[k,0]$| where the X in the $R_x[k,n]$ denotes the busiest sector at time n=0($X \in \{\alpha,\beta,\gamma\}$)

Figure 10:
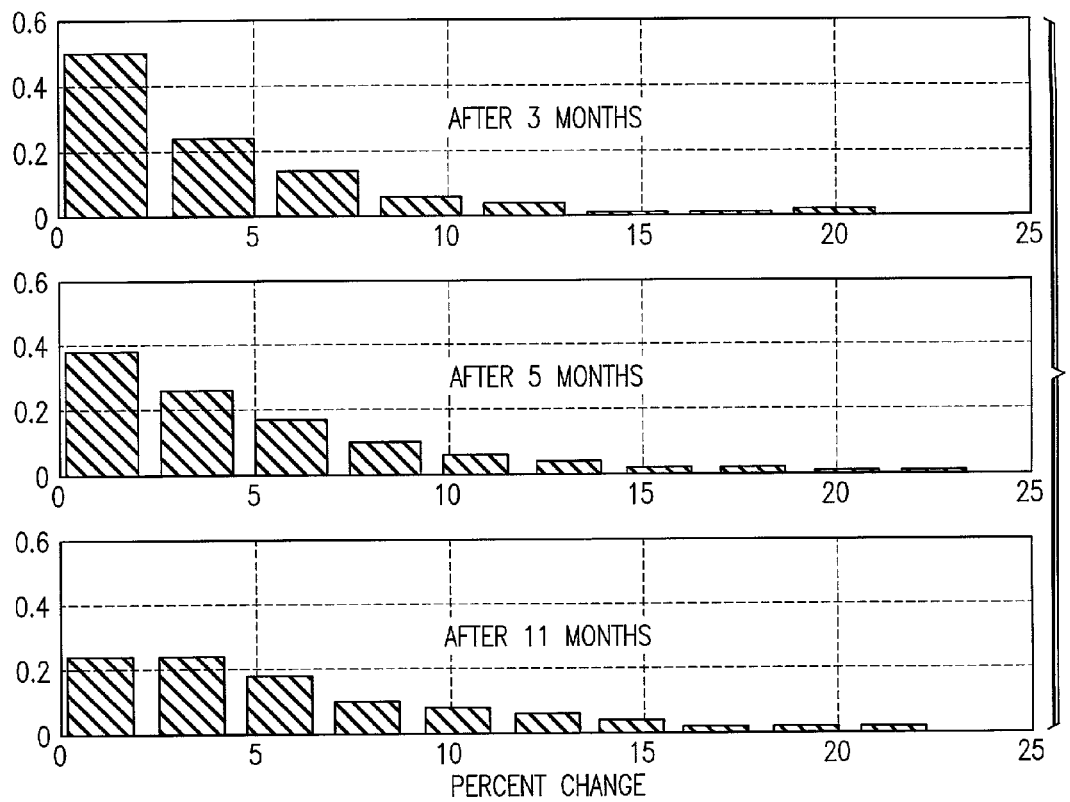
FIG. 10 shows a histogram of site sector loading changes as experienced in a particular market area.

Directing attention to FIG. 10, a histogram of site loading changes in the San Jose, Calif. market is shown wherein the x-axis represents the percentage change in loading and the y-axis represents the probability of that change occurring. The loading changes of FIG. 10 are shown with respect to 3, 5, and 11 months from the reference month n=0.

Figure 11:
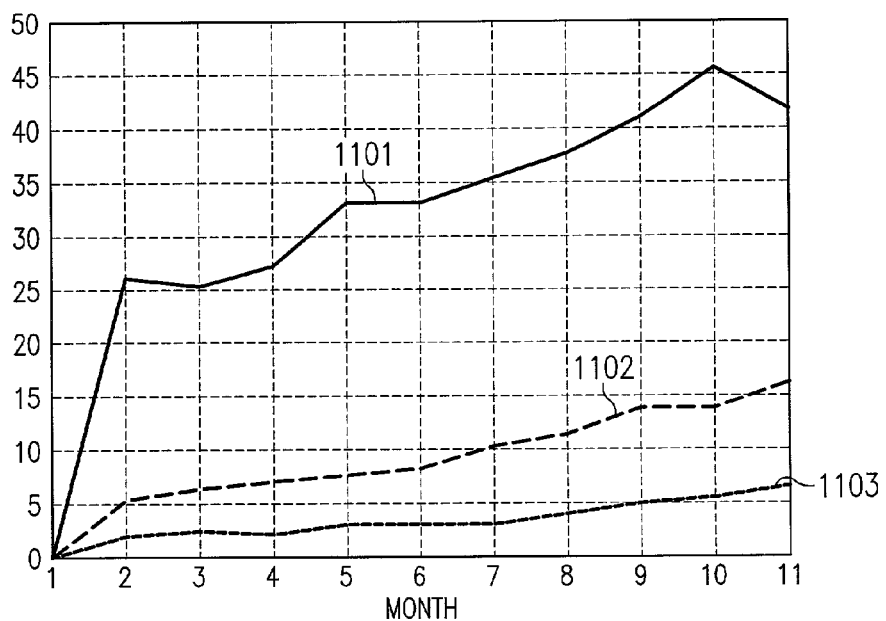
FIG. 11 shows the probability of loading changes as derived from the histogram of FIG. 10.

Directing attention to FIG. 11, the probability for change in traffic loads of at least 5, 10, and 15% are shown (lines 1101–1103 respectively) versus month. From the above, it can be seen that, in most cases, the traffic load ratio between sectors may generally be expected to remain stable over a 12 month period. For example, the probability to have a change larger than 10% over 6 months is approximately 8%, and over 12 months is approximately 16%. Accordingly, fixed systems may be implemented such that cell sculpting of the present invention substantially equalizes loading among cells and/or sectors. For example, loading information may be used with direction finding information to determine cells and/or sectors which should be provided a particular contour in order to result in substantially equal loading throughout the network or some portion thereof.

From the above capacity gain analysis, it is expected that a fully adjustable system implementing cell sculpting according to the present invention could provide on average approximately 35% capacity increase to a typical prior art network configuration. However, as discussed previously, there are advantages to providing a passive personality module, resulting in a fixed system. It is predicted from the analysis above that such a fixed approach would result in approximately 10% less capacity increase as compared to a fully adjustable system, or approximately a 25% capacity increase over a typical prior art network configuration. Moreover, given the simplicity of the preferred embodiment personality module structure, it may be acceptable to replace the cell sculpting modules periodically, such as every 12 months, to thereby provide capacity increases more near that achievable with a fully adjustable system.

Figure 12:
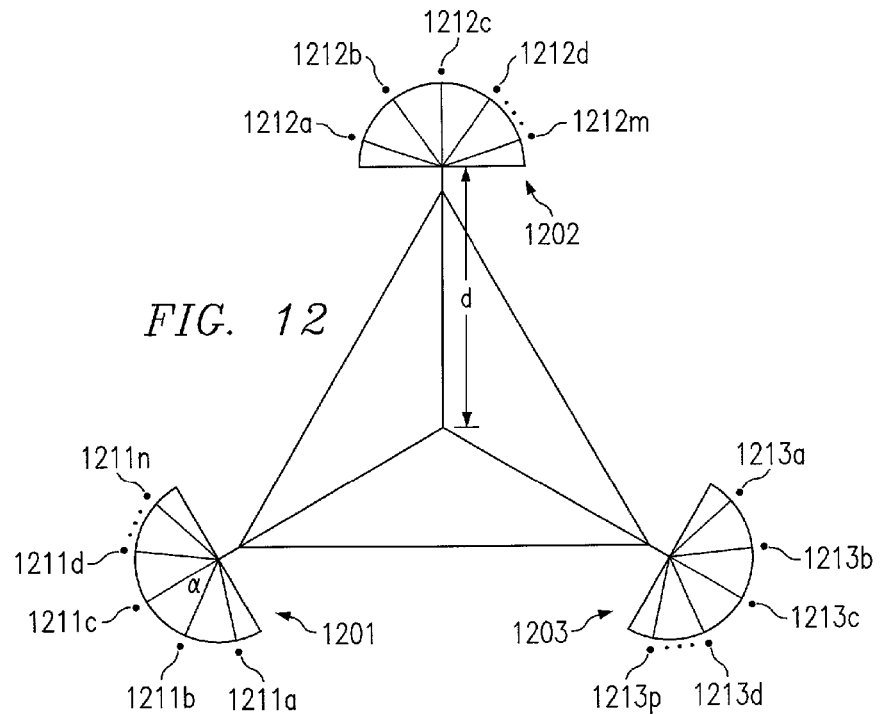
FIG. 12 shows a preferred embodiment curvilinear antenna array configuration according to the present invention.
Figure 13:
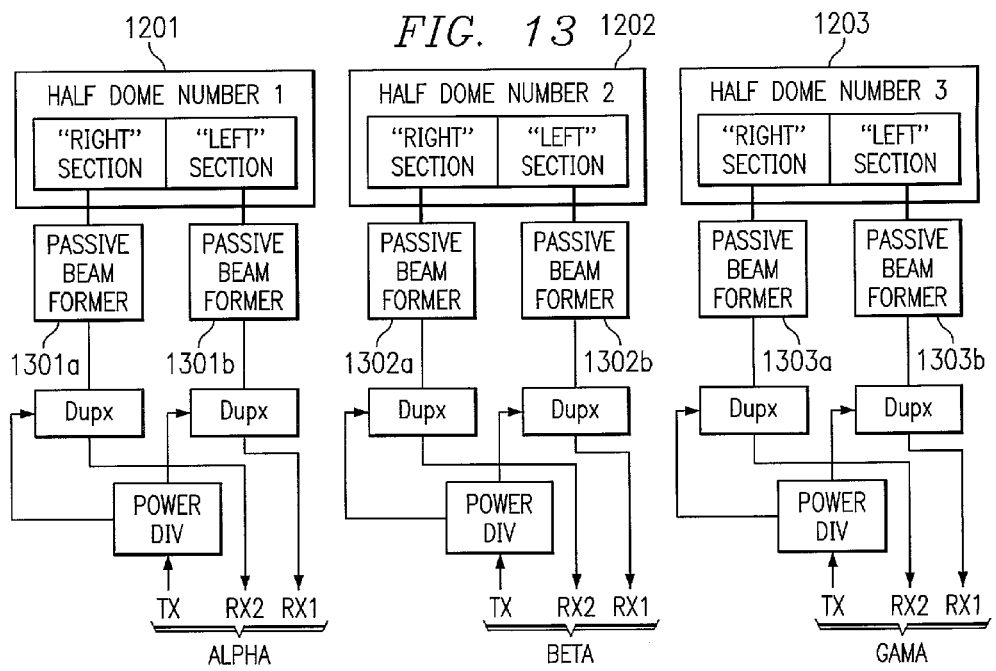
FIG. 13 shows a preferred embodiment schematic diagram of circuitry coupling the antenna array configuration of FIG. 12 to base transceiver station equipment.

A preferred embodiment implementation of the present invention is illustrated schematically in FIGS. 12 and 13. Specifically, an arrangement of curvilinear arrays, here half dome arrays 1201–1203, are shown using simple passive beam forming networks of a preferred embodiment, here passive beam formers 1301a–1303b, to provide cell sculpting of the present invention with a desired level of diversity performance in the links. The preferred embodiment curvilinear arrays are sections of a cylindrical antenna structure, such as shown in the above referenced patent application entitled "Base Station Clustered Adaptive Antenna Array" and U.S. Pat. No. 6,188,272 entitled "System and Method for Per Beam Elevation Scanning," spaced a suitable distanced d from a center point, such as approximately 200 cm, to provide decoupling there between. For example, each curvilinear array may consist of any number of antenna elements or columns, preferably a relatively large number of antenna columns, which when coupled to the beam formers provides desired antenna beam patterns. Preferably, equally spaced dipole antenna columns are utilized, such as columns 1211a–1211n, 1212a–1212m, and 1213a–1213p of the illustrated embodiment, where n, m, and p are most preferably any number from 12 to 17 and the angle α there between is preferably approximately 18°.

The use of such curvilinear arrays is advantageous when a desired beam width is relatively large, such as beam widths greater than 120 degrees. For example, the above described preferred embodiment half dome arrays are capable of forming very wide beams, such as on the order of 200° or more, thereby leveraging the use of the preferred embodiment simple passive beam forming networks.

In providing signal diversity, the illustrated embodiment groups the antenna array columns into groups (here a "right section" and a "left section") for coupling to the beam formers. Referring to FIG. 13, it can be seen that, in the illustrated embodiment, for transmission the right and left sections are combined together to form transmit (TX) sector beams, while for receive, the right and left sections are fed directly into the receive (RX) diversity ports. This preferred embodiment provides for both transmit sectorization flexibility and receive diversity.

Additionally or alternatively, dual polarization may be utilized according to the present invention. For example, interleaved antenna element columns of orthogonally polarized elements as shown in the above referenced U.S. Pat. No. 6,188,272 entitled "System and Method for Per Beam Elevation Scanning," may be utilized where a first polarization (e.g., 45° polarization) provides a first section and a second polarization (e.g., −45° polarization) provides a second section of the above example.

Although a preferred embodiment implementation of the present invention has been described with reference to the use of curvilinear arrays, it should be appreciated that linear arrays, such as flat panel arrays, may be utilized according to the present invention. Such flat panel arrays may be utilized substantially as described above with respect to the curvilinear arrays where more narrow beam widths are desired, such as beam widths of 120° and less (although where wider beam widths are desired a plurality of such flat panel arrays may be used with the appropriate feed circuitry to allow beam forming across multiple panels). Moreover, such flat panel arrays having personality modules of the present invention may be used to directly replace existing BTS antennas to thereby provide advantages of the present invention without requiring substantial alteration of the BTS.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing improved wireless communication, said method comprising:
   determining link budget angular profile information with respect to a service area; and
   reducing a standard deviation of a link budget of a signal of interest as measured radially in said service area using said link budget angular profile information.

2. The method of claim 1, wherein said reducing said standard deviation comprises:
   adapting transmission of said signal of interest to topological and morphological features of said service area to thereby provide substantially consistent link budget in at least a portion of said service area.

3. The method of claim 2, wherein said reducing said standard deviation comprises:
   adapting transmission link budget of signals providing communication in neighboring service areas to topological and morphological features of corresponding ones of said neighboring service areas to thereby provide substantially consistent interference energy in said service area.

4. The method of claim 1, wherein said service area comprises a cell of a cellular communication network.

5. The method of claim 4, wherein said signal of interest comprises a forward link signal of a cellular base station.

6. The method of claim 5, wherein said signal of interest comprises a reverse link signal of a cellular base station.

7. The method of claim 1, wherein reducing said standard deviation reduces said standard deviation from approximately 9 dB to approximately 4 dB.

8. The method of claim 1, wherein said reducing said standard deviation comprises:
deploying an antenna array having a relatively large number of antenna columns for providing communication services within said service area; and
coupling a feed network to said antenna array which in use remediates radial variance of signal communication of said communication services within said cell.

9. The method of claim 8, wherein said antenna array comprises a flat panel array.

10. The method of claim 9, wherein said antenna columns of said flat panel array include a first group of antenna columns and a second group of antenna columns, wherein said first and second groups of antenna columns are coupled to said feed network to provide signal diversity in at least one link direction.

11. The method of claim 9, wherein said flat panel array includes at least eight antenna element columns.

12. The method of claim 11, wherein said at least eight antenna element columns are disposed to provide an antenna beam width of at least 120°.

13. The method of claim 8, wherein said antenna array comprises a curvilinear array.

14. The method of claim 13, wherein said antenna columns of said curvilinear array include a first group of antenna columns and a second group of antenna columns, wherein said first and second groups of antenna columns are coupled to said feed network to provide signal diversity in at least one link direction.

15. The method of claim 13, wherein said curvilinear array is adapted to provide a relatively large range of antenna beam widths including approximately 10° to approximately 170°.

16. The method of claim 13, wherein said curvilinear array includes at least twelve antenna element columns.

17. The method of claim 16, wherein said at least twelve antenna element columns are disposed to provide an antenna beam width of at least 200°.

18. The method of claim 1, wherein said reducing said standard deviation comprises:
forming an antenna pattern, using said link budget angular profile information, such that path loss and antenna gain summed as a function of azimuth provide a substantially consistent result.

19. The method of claim 1, wherein said determining said link budget angular profile information includes use of footprint information with respect to said cell.

20. The method of claim 1, wherein said determining said link budget angular profile information includes use of monitored communication attributes in combination with direction finding functionality.

21. A method for providing cellular system communication capacity increase, said method comprising:
determining topology and morphology information with respect to a first cell of said cellular system;
deploying an antenna array having a relatively large number of antenna columns for providing communication services within said first cell; and
coupling a feed network to said antenna array which in use remediates radial variance of signal link budget of said communication services within said cell at least in part in correspondence to said topology and morphology information.

22. The method of claim 21, wherein said antenna columns of said antenna array include a first group of antenna columns and a second group of antenna columns, wherein said first and second groups of antenna columns are coupled to said feed network to provide signal diversity in at least one link direction.

23. The method of claim 22, wherein a number of antenna columns of said first group of antenna columns is the same as a number of antenna columns of said second group of antenna columns.

24. The method of claim 22, wherein said signal diversity is provided through forming a first said at least one link direction beam using said first group of antenna columns substantially independently of forming a second said at least one link direction beam using said second group of antenna columns.

25. The method of claim 22, wherein said first and second groups of antenna columns are coupled to said feed network to provide beam forming in a link direction other than said at least one link direction using antenna columns of both said first and second groups of antenna columns.

26. The method of claim 25, wherein said at least one link direction is a reverse link and said link direction other than said at least one link direction is a forward link.

27. The method of claim 21, wherein said determining topology and morphology information comprises:
analyzing reverse link characteristics of a communication system operating in said first cell.

28. The method of claim 27, wherein said reverse link characteristics include a hopping sequence.

29. The method of claim 27, wherein said reverse link characteristics include a training sequence.

30. The method of claim 21, wherein said determining topology and morphology information comprises:
determining traffic loading as a function of azimuth.

31. The method of claim 30, wherein said determining traffic loading includes the use of radio direction finding.

32. The method of claim 21, wherein said determining topology and morphology information comprises:
collecting communication attribute information.

33. The method of claim 32, wherein said collecting communication attribute information comprises:
conducting a drive test.

34. The method of claim 21, wherein said determining topology and morphology information comprises:
determining areas of said cell in which a signal to noise energy characteristic is undesirable as compared to a threshold value.

35. The method of claim 34, wherein said signal to noise energy characteristic is determined as a ratio of energy per chip of a pilot to a total received spectral density.

36. The method of claim 35, wherein said threshold value is −15 dB.

37. The method of claim 21, wherein said antenna array comprises a flat panel array.

38. The method of claim 37, wherein said flat panel array includes at least eight antenna element columns.

39. The method of claim 38, wherein said at least eight antenna element columns are disposed to provide an antenna beam width of at least 120°.

40. The method of claim 21, wherein said antenna array comprises a curvilinear array.

41. The method of claim 40, wherein said curvilinear array is adapted to provide a range of antenna beam widths including approximately 10° to approximately 170°.

42. The method of claim 40, wherein said curvilinear array includes at least twelve antenna element columns.

43. The method of claim 42, wherein said at least twelve antenna element columns are disposed to provide an antenna beam width of at least 200°.

44. The method of claim 42, wherein said curvilinear array includes not more than seventeen antenna element columns.

45. The method of claim 42, wherein an angle α between said antenna element columns is approximately 18°.

46. The method of claim 40, wherein said curvilinear array is one of a plurality of curvilinear arrays spaced a predetermined distance d from a center point to provide communication coverage of said first cell.

47. The method of claim 46, wherein said predetermined distance is approximately 200 cm.

48. The method of claim 21, wherein said feed network is a passive feed network adapted for deployment at a masthead with said antenna array.

49. The method of claim 21, wherein said feed network comprises a microstrip line configured to provide impedances consistent with complex signal weighting associated with said radial variance.

50. The method of claim 49, wherein said microstrip line comprises an air-line transmission line.

51. The method of claim 21, further comprising:

decoupling said feed network from said antenna array after a period of time in which said topology and morphology information with respect to said first cell has changed; and coupling a replacement feed network to said antenna array which in use remediates radial variance of signal link budget of said communication services with respect to said changed topology and morphology information.

52. The method of claim 51, wherein said decoupling said feed network and said coupling said replacement feed network is undertaken substantially periodically.

53. The method of claim 52, wherein a period of said decoupling said feed network and said coupling said replacement feed network is approximately twelve months.

54. The method of claim 51, wherein said decoupling said feed network and said coupling said replacement feed network is undertaken upon determining said topology and morphology information has changed significantly.

55. The method of claim 54, wherein determining said topology and morphology information has changed significantly includes a determination that a percentage of said first cell larger than a predetermined threshold percentage is experiencing undesirable communication services.

56. The method of claim 55, wherein said undesirable communication services comprises outage conditions as determined by an energy per chip of a pilot to a total received spectral density is less than a predetermined threshold.

* * * * *